United States Patent [19]

Kurosaki

[11] 4,061,299
[45] Dec. 6, 1977

[54] CORD CLAMP

[75] Inventor: Mutsuo Kurosaki, Moriguchi, Japan

[73] Assignee: Nifco Inc., Tokyo, Japan

[21] Appl. No.: 682,289

[22] Filed: May 3, 1976

[30] Foreign Application Priority Data

May 6, 1975 Japan .................................. 50-59732

[51] Int. Cl.² .............................................. F16L 3/08
[52] U.S. Cl. ................................ 248/73; 248/74 PB;
248/220.4
[58] Field of Search ............. 248/71, 73, 74 B, 74 PB,
248/74 R, 74 A, 220.2, 220.3, 220.4, 221.2,
222.2, 222.3

[56] References Cited

U.S. PATENT DOCUMENTS

| 3,088,702 | 5/1963 | Orenick et al. | 248/74 PB UX |
| 3,100,922 | 8/1963 | Burniston | 248/73 UX |
| 3,529,795 | 9/1970 | Van Niel | 248/74 PB X |
| 3,667,710 | 6/1972 | Moody et al. | 248/74 PB X |

FOREIGN PATENT DOCUMENTS

| 1,230,280 | 9/1960 | France | 248/73 |
| 1,545,835 | 10/1968 | France | 248/74 PB |

OTHER PUBLICATIONS

ITW Fastex Catalog, May, 1971.

Primary Examiner—Lawrence J. Staab
Attorney, Agent, or Firm—Jack R. Halvarsen; Robert W. Beart

[57] ABSTRACT

Disclosed is a plastic cord clamp which comprises a pair of opposed arcuate holding members having the lower ends thereof connected with each other through an intervening thin-walled hinge portion to form a roundly bent main clamp body, said hinges portion being flexible to the extent of allowing said opposed holding members to diverge or converge freely about said hinge portion as the fulcrum, mutually engageable pawls formed one each at the upper ends of said pair of holding members and a pair of leg members formed one each at the lower ends of said pair of holding members and adapted to protrude outwardly therefrom tangentially to the clamp body in opposite directions, whereby said two leg members converge when said upper ends of holding members are opened to admit a cord between the two holding members and the leg members diverge and come into fast engagement with the edges of matching perforations bored in a holder plate when said engaging pawls are closed in on the admitted cord and brought into mutual engagement, with the result that the main clamp body is immobilized relative to the cord as well as the holder plate.

6 Claims, 4 Drawing Figures

CORD CLAMP

BACKGROUND OF THE INVENTION

This invention relates to a cord clamp. More specifically, the present invention relates to a cord clamp fabricated of a plastic in a unitary construction such that when a cord to be retained in position is inserted and secured in the main clamp body thereof and the holding pawls thereof are brought into fast engagement to prevent the secured cord from slipping off the clamp body, the pair of leg members supporting the clamp body diverge and consequently immobilize the cord clamp on a holder plate for the cord clamp.

In conventional cord clamps of this type, clamp members are formed in sizes smaller than the diameters of cords subjected to clamping so that the cords may be forcibly snapped into said clamp members and secured in position therein. (Refer to U.S. Pat. Nos. 2,166,916 and 3,540,687, for example.)

The cord clamp disclosed by said U.S. Pat. No. 2,166,916 is fabricated from a single metallic sheet in such a manner that when a cord is clamped therein, the pair of legs serving to support the clamp member thereof diverge and cause the cord clamp to be immobilized onto a holder plate. The cord clamp of the type in which the cord is simply snapped into position in the clamp member, however, has a disadvantage in that the cord may possibly slip out of the clamp member under vibration or resilient deformation due to external forces exerted thereon when the cord is handled.

An object of the present invention is to provide a plastic cord clamp which permits the cord to be fastened stably onto a holder plate without involving any possibility of the cord slipping out of the clamp body.

Another object of the present invention is to provide a cord clamp of the type which can easily be fabricated in a unitary construction by injection molding of a plastic.

SUMMARY OF THE INVENTION

To accomplish the objects described above, according to the present invention, there is provided a cord clamp which comprises a pair of opposed arcuate holding members having the lower ends thereof connected with each other through an intervening thin-walled hinge portion to form a roundly bent main clamp body, said hinge portion being flexible to the extent of allowing said opposed holding members to diverge or converge freely around said hinge portion as the fulcrum, and mutually engageable pawls formed one each at the upper ends of said holding members and leg members formed one each at the lower ends of said holding members and adapted to protrude outwardly therefrom tangentially to the clamp body in opposite directions.

The two leg members of the cord clamp are inserted into matching perforations bored through a holder plate and, with a cord laid in position through the opening between the holding members, said holder members are closed to permit the engaging pawls at the opposed ends thereof to come into fast engagement. Consequently, the two leg members diverge and engage themselves with the outer side of the holder plate, causing the main clamp body to be immobilized on the holder plate. Since the clamp body is provided with the engaging members as described above, the cord secured in position inside the clamp body cannot slip out of position. At the same time, said fast closure of the engaging members causes the clamp body to be fastened fast to the holder plate. Moreover, since the cord clamp of the present invention has a simple construction, it can easily be fabricated in a unitary form by the conventional technique of injection molding of a plastic.

The other objects and other characteristic features of the present invention will become apparent from the description to be given in further detail herein below with reference to the accompanying drawing.

BRIEF DESCRIPTION OF THE DRAWINGS

In FIG. 2, (A) is a front view showing the holding members held in a diverged state, (B) a front view showing the diverged holding members in a state embracing an admitted cord and the leg members in a state inserted through the perforations in the holder plate and (C) a front view showing the holding members in a state having the engaging pawls joined with each other and consequently having the admitted cord firmly held and the leg members in a state diverged below the holder plate for thereby causing the main clamp body to be immobilized on the holder plate.

DESCRIPTION OF THE PREFERRED EMBODIMENTS

Figure 1:
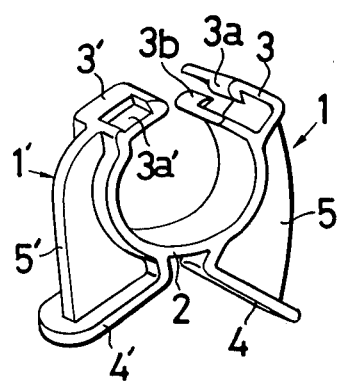
FIG. 1 is a perspective view of one preferred embodiment of the cord clamp according to the present invention.

The drawing depicts one preferred embodiment of the cord clamp according to the present invention. With reference to this drawing, 1, 1' denote arcuate holding members having the concave surfaces thereof opposed to each other and 2 denotes a thin-walled hinge portion extending between the lower ends of said holding members 1, 1' to connect the two members integrally. The main clamp body of the present invention is formed by having said pair of the opposed holding members 1, 1' and said hinge portion 2 integrally joined in such way as to assume a substantially circularly bent shape. At the same time, said hinge portion 2 is given a wall thickness small enough for the main clamp body to be bent above this hinge portion as the fulcrum, so that said opposed holding members 1, 1' may freely be diverged.

This main clamp body is provided with mutually engageable pawls 3, 3' disposed one each at the free (upper) ends of said pair of holding members 1, 1' and also with leg members 4, 4' disposed one each at the lower ends of said holding members and adapted to protrude outwardly therefrom tangentially to the clamp body in opposite directions.

Of the opposed engageable pawls 3, 3' in the illustrated preferred embodiment, one pawl 3 is formed in the shape of a fishhook in section so as to admit therein the other engaging pawl 3' which is formed in the shape of an arrow tail. The latter engaging pawl 3' has claws 3a, 3b formed in a slightly laterally staggered relationship on the inner wall surfaces at the opening thereof, whereby the claws 3a and 3b will come into engagement with the respective engaging grooves 3a', 3b' which are formed on the opposed outer surfaces of said engaging pawl 3' of the shape of an arrow tail. Said engaging claws 3a, 3b are so adapted that once they are engaged with said engaging grooves, the pawls now in mutual engagement will be prevented from being separated from each other in the lateral direction.

The leg members 4, 4' which are disposed at the lower ends of said holding members are permitted to protrude outwardly from a level lower than said hinge portion 2 and are also adapted to diverge and fall into one continuous plane when the holding members are closed up. In the particular preferred embodiment illustrated herein, reinforcing ribs 5, 5' are disposed one each between the outer sides of said holding members and the upper sides of said leg members so that said leg members may each maintain an approximately tangential relationship with the circle formed by the closed holding members.

In the drawing, 6 denotes a holder plate intended to immobilize the clamp of this invention having the aforementioned construction. In this holder plate 6 there are formed perforations 7, 7' designed to provide engagement with said leg members.

Actual use of the clamp of the present invention will now be described with reference to FIG. 2.

Figure 2A:
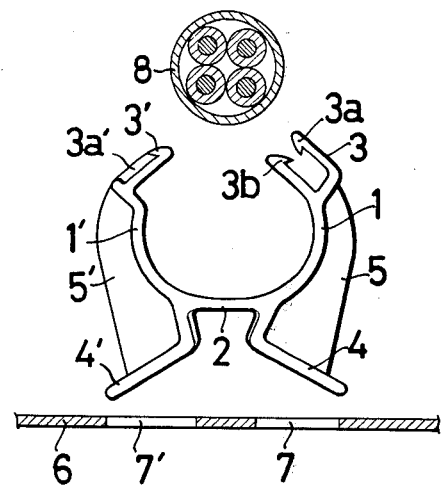
FIG. 2 is an explanatory diagram illustrating the cord clamp of FIG. 1 in the states assumed during its use.
Figure 2B:
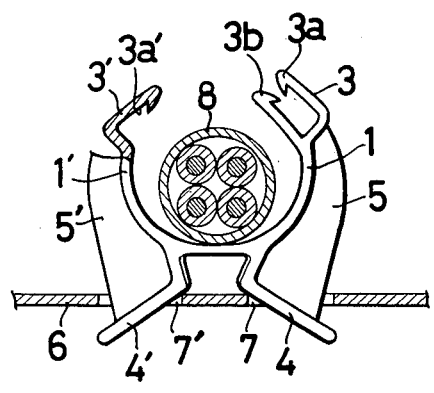

In order for the clamp of this invention to admit a cord 8 desired to be held in position, the opposed holding members 1, 1' are opened about the hinge portion 2 as a fulcrum and the cord 8 is inserted downwardly into the space embraced inside the main clamp body as illustrated in FIG. 2(A). As the holding members are opened as shown above, the leg members 4, 4' at the lower ends are consequently caused to converge. The leg members, still retained in the converged state, are inserted through the perforations 7, 7' bored through the holder plate 6 as illustrated in FIG. 2(B). When the leading tips of the leg members protrude below the lower surface of the holder plate, the holding members 1, 1' are closed from their opened state to have the engaging pawls 3, 3' at the upper ends thereof come into mutual engagement and clamp the cord 8 internally. When the holding members are closed tightly against each other as described above, the leg members 4, 4' which have their leading tips inserted through said perforations 7, 7' are caused to diverge about the hinge portion 2 as the fulcrum. As a consequence, the leg members advance past the perforations and at the same time their respective leading tips thrust along the lower surfaces of the outer edges of said perforations and finally come into fast engagement with said lower surfaces. The clamp which has already embraced said cord, therefore, is permitted to catch firmer hold of said cord and at the same time immobilize itself relative to the holder plate.

Figure 2C:
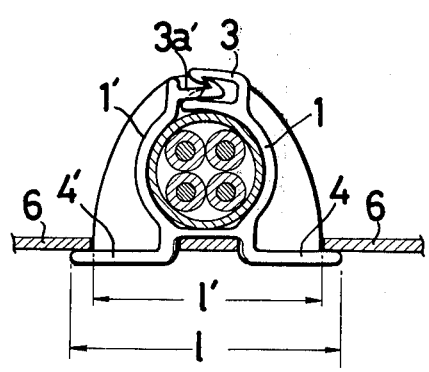

It is not absolutely necessary to bore two perforations 7, 7' through said holder plate. However, when the perforations are so formed, the opposed leg members are received in separate perforations as illustrated and the portion of said plate extending between the perforations comes to support the lower surface of the hinge portion 2 as the leg members are inserted completely through the perforations (as shown in FIG. 2(C)), with the result that this contact prevents the main clamp body from falling below the holder plate and permits it to be immobilized stably.

Said perforations are so positioned on the holder plate that when the leg members 4, 4' are allowed to diverge, the distance $l$ 40 between the outer edges of the perforations is smaller than the span $l$ between the leading tips of the spread leg members, whereby the leading ends of the leg members are safely engaged with the lower surfaces of said edges of the perforations.

As described above, the clamp of the present invention permits the work of holding the cord to be accomplished simultaneously with the work of causing the main clamp body to be immobilized on the holder plate. Thus, it enjoys excellent working efficiency. Since the clamp cannot be removed from the holder plate unless the mutual engagement of the holding members is broken, the cord can be fastened safely to the holder plate.

Since the clamp of the present invention is fabricated of a plastic, it excels in insulating property. It, therefore, can be used quite advantageously such as when a cord is to be attached to a metal plate.

What is claimed is:

1. A one-piece plastic cord clamp, which comprises a pair of opposed, substantially rigid arcuate holding members, a hinge portion connecting the lower ends of said pair of holding members, said pair of holding members and said hinge portion being so disposed as to form a main clamp body, a pair of mutually engageable pawls formed one each at the upper ends of said pair of holding members, and a pair of leg members formed one each at the lower ends of said holding members and adapted to initially protrude outwardly therefrom in an angularly diverging relation so that said leg members converge about said hinge portion as a fulcrum when said engaging pawls are opened and the leg members flex about said fulcrum into a substantially co-planar, oppositely extending relationship when the engaging pawls are closed into fast mutual engagement, said pawls including a female portion at the upper end of one holding member and a male portion at the upper end of the other holding member, said female portion including laterally spaced hook means projecting into the mouth of said female portion and said male portion including oppositely facing laterally spaced shoulder means for engaging said hook means whereby said holding portions are positively locked by said male and female portions against both lateral and circumferential openings.

2. A clamp of the type claimed in claim 1 in combination with an apertured plate-like support member wherein said member includes a pair of apertures spaced by a bridging portion, said legs initially projecting angularly through said spaced apertures and thence engaging the opposite side of said support member adjacent the remote edges of the two apertures when the clamp is closed, said legs being substantially parallel to said support in closed position and said hinge portion engaging the opposite surface of said support in the vicinity of said bridging portion.

3. A clamp of the type claimed in claim 2 wherein a pair of substantially rigid integral reinforcing ribs which each interconnect and support one of said arcuate holding members relative to its associated leg member, said rigid ribs terminating short of the extremity of said legs to provide a lip on said legs for engaging the opposite side of said support members adjacent to and beyond the remote edges of the two apertures, the distance between the remote edges of the two apertures having a predetermined dimension and the spacing between the edges of said rigid ribs being substantially equal to or less than said predetermined dimension whereby said ribs serve as a locating means and shear means within said apertures.

4. A clamp of the type claimed in claim 3 wherein said legs are L-shaped, each L-shape having a short limb and a long limb, said short limb of each leg being attached to said hinge portion with the long limb extending outwardly away from the short limb, the spacing of the short limbs of the two legs being substantially the same as the width of the bridging portion to thereby engage the edge of the aperture adjacent the bridging portion with the rib engaging the remote edge of the aperture to thereby positively locate the clamp within the apertures.

5. A one-piece plastic cord clamp in combination with an apertured plate-like support member wherein said member includes a pair of apertures spaced by a bridging portion, said clamp including a pair of opposed, substantially rigid arcuate holding members, a hinge portion connecting the lower ends of said pair of holding members, said hinge portion being generally rectangular in configuration and hingedly connected in spaced relation along opposite ends thereof to said holding members, said pair of holding members and said hinge portion being so disposed as to form a main clamp body, a pair of mutually engageable pawls formed one each at the upper ends of said pair of holding members, and a pair of leg members formed one each at the lower ends of said holding members and adapted to initially protrude outwardly therefrom in an angularly diverging relation so that said leg members converge intermediately of said hinge portion as a fulcrum when said engaging pawls are opened said legs initially projecting angularly when telescoped through said spaced apertures and then said leg members flex about said fulcrum into a substantially co-planar, oppositely extending relationship when the engaging pawls are closed into fast mutual engagement, whereby said legs engage the opposite side of said support member adjacent the remote edges of said two apertures when the clamp is closed, said legs being substantially parallel to said support in closed position and said hinge portion engaging the opposite surface of said support in the vicinity of said bridging position.

6. A clamp of the type claimed in claim 5 wherein said clamp includes a pair of substantially rigid integral reinforcing ribs which each interconnect and support one of said arcuate holding members relative to its associated leg member.

* * * * *